(12) United States Patent
Liang et al.

(10) Patent No.: US 9,104,945 B2
(45) Date of Patent: Aug. 11, 2015

(54) METHOD AND APPARATUS FOR SPECIFIC IMAGE DETECTION

(71) Applicant: Alibaba Group Holding Limited, Grand Cayman (KY)

(72) Inventors: Ningqing Liang, Hangzhou (CN); Feijun Jiang, Hangzhou (CN); Zengming Zhang, Hangzhou (CN); Depin Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/312,479

(22) Filed: Jun. 23, 2014

(65) Prior Publication Data

US 2014/0376806 A1 Dec. 25, 2014

(30) Foreign Application Priority Data

Jun. 24, 2013 (CN) .......................... 2013 1 0254232

(51) Int. Cl.
*G06K 9/00* (2006.01)
*G06K 9/46* (2006.01)
*G06T 7/00* (2006.01)

(52) U.S. Cl.
CPC ............ *G06K 9/4652* (2013.01); *G06T 7/0004* (2013.01)

(58) Field of Classification Search
USPC ......... 382/165, 162, 266, 192, 194, 199, 318, 382/319; 345/443; 348/280, 384.1, 415.1; 358/3.03, 1.9, 2.1, 3.26, 3.27, 525; 375/E7.094
See application file for complete search history.

(56) References Cited

U.S. PATENT DOCUMENTS

| | | | | |
|---|---|---|---|---|
| 5,420,971 | A | * | 5/1995 | Westerink et al. ............ 382/199 |
| 7,158,261 | B2 | * | 1/2007 | Kurose ........................... 358/2.1 |

(Continued)

FOREIGN PATENT DOCUMENTS

| | | |
|---|---|---|
| EP | 2509045 | 10/2012 |
| WO | WO2013044019 | 3/2013 |

OTHER PUBLICATIONS

Dutta, et al., "Gradient based Approach for Text Detection in Video Frames", retrieved on Aug. 25, 2014 at <<http://www.comp.nus.edu.sg/~tancl/publications/c2009/ICSIP2009-3.pdf>>, Jul. 2009, pp. 387-393.

(Continued)

*Primary Examiner* — Anh Do
(74) *Attorney, Agent, or Firm* — Lee & Hayes, PLLC (57) ABSTRACT

Detecting a specific image applicable at a website includes detecting an existence of a frame of the specific image. The specific image applicable at the website is obtained. An edge characteristic value of each pixel of the image is calculated. A pixel whose edge characteristic value is a local maximum value is found along a slope direction of each pixel. When the edge characteristic value of the found pixel is larger than a preset characteristic value threshold, a preset color is used to fill the pixel. The specific image is scanned. An amount of pixels whose color is the preset color at each scanning line of the specific image is counted. When the amount of such pixels at a scanning line is larger than a preset number threshold, a line where the scanning line locates is determined as an edge line of the frame.

20 Claims, 5 Drawing Sheets

(56) References Cited

U.S. PATENT DOCUMENTS

| | | |
|---|---|---|
| 7,542,170 B2 * | 6/2009 | Chen et al. ............ 358/3.03 |
| 7,659,930 B2 * | 2/2010 | Wu ...................... 348/280 |
| 2009/0324090 A1 | 12/2009 | Tanaka |
| 2011/0279475 A1 | 11/2011 | Ikenoue |
| 2011/0293147 A1 | 12/2011 | Utsumi et al. |
| 2013/0022281 A1 | 1/2013 | Sato |
| 2013/0156308 A1 | 6/2013 | Abe |
| 2013/0162769 A1 | 6/2013 | Zhou et al. |

OTHER PUBLICATIONS

PCT Search Report and Written Opinion mailed Sep. 10, 2014 for PCT Application No. PCT/US14/43710, 13 Pages.

* cited by examiner

METHOD AND APPARATUS FOR SPECIFIC IMAGE DETECTION

CROSS REFERENCE TO RELATED PATENT APPLICATIONS

This application claims foreign priority to Chinese Patent Application No. 201310254232.5 filed on 24 Jun. 2013, entitled "Method and Apparatus for Detecting Specific Image Applicable at Website," which is hereby incorporated by reference in its entirety.

TECHNICAL FIELD

The present disclosure is related to the field of graph and image information processing, and more particularly, to a method and an apparatus for detecting a specific image applicable at a website.

BACKGROUND

With the development of graph and image information technology, it is more and more common to provide information at a website through an image or a picture, which is as popular as it is intuitive and convenient and which provides high volume information. Compared with traditional text, the technology for presenting graphs and images at a website is more difficult. Due to a specialty of the website and its business type, not every image with any format or any attribute (or unspecific image) may comply with applicable requirements of the website. Thus, before or after the image is applied at the website, the image often needs detecting to ensure it is a qualified image.

The conventional techniques mainly use two methods to detect a specific image that is applicable at the website. One method is an automatic detecting method that is directed to basic information of the specific image. The other method is a manual detecting method with respect to complex information of the specific image. The former method, for example, reads information such as heights and widths of images from an image database and calculates other basic information such as a ratio of the height to width. As the applications of the website are more and more complicated and diversified, the simple automatic detecting method for the basic information, although satisfying a requirement of efficiency, fails to meet a requirement of detecting complicated information. The latter method, after analyzing the images in the database, obtains complicated information such as an existence of a frame of the image, a region of a principal content, and a region of a background. However, when there is a massive amount of images applicable at the website, the manual detecting method cannot satisfy such requirements. Thus, the conventional techniques cannot satisfy the requirement of applying the specific images at the website.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present techniques improve diversity of results in the direction technology.

The present disclosure provides example methods and apparatuses for detecting a specific image applicable at a website. The present techniques satisfy requirements of detecting complicated information and detecting efficiency.

An example method for detecting the specific image applicable at the website includes detecting basic information of the specific image. The example method for detecting the specific image applicable at the website may also include detecting an existence of a frame of the specific image, which may include the following operations.

The specific image applicable at the website is obtained. For example, the specific image is an image that satisfies an application requirement of the website according to a type of the website.

An edge characteristic value of each pixel of the image is calculated. A pixel whose edge characteristic value is a local maximum value is found along a slope direction determined by the edge characteristic value of each pixel. When the edge characteristic value of the found pixel is larger than a preset characteristic value threshold, a preset color is used to fill the pixel whose edge characteristic value is the local maximum value.

The specific image is scanned. An amount of pixels whose color is the preset color at each scanning line of the specific image is counted. For example, when the amount of such pixels at a scanning line is larger than a preset number threshold, a line where the scanning line locates is determined as an edge line of the frame.

For example, when the amount of such pixels at the scanning line is larger than the preset number threshold and the scanning line is located within an area determined by a preset length to the edge of the specific image, the line where the scanning line locates is determined as the edge line of the frame.

For another example, when the frame of the specific image is a quadrilateral and the frame has a certain width, the method for detecting the existence of the frame may further include the following operations. A most interior edge line among the determined multiple edge lines is determined as an interior boundary. A most exterior edge line among the determined multiple edge lines is determined as an exterior boundary. A distance between the interior boundary and the exterior boundary is determined as a width of the frame. The width of the frame is divided by the preset distance length. A weight A is assigned according to a result of the division. If a sum of the weights of four sides of the quadrilateral is larger than a first preset weight threshold, the specific image is determined as qualified to be applicable at the website.

For another example, the example method may also include detecting a main content area of the specific image. The detecting of the main content area of the specific image may include the following operations. The specific image is converted to a grayscale image including at least two colors. A connection area of each color is marked in the grayscale image. A connection area that is larger than a preset proportion of a total area of the specific image is obtained. An amount of pixels in each connection area that are within a preset distance to the edge of the specific image is counted. If the amount of pixels is not larger than a certain portion of a total amount of pixels in the connection area, the connection area is determined as the main content area of the specific image.

In an example embodiment, according to a size relationship between an area of the main content area of the specific image and the total area of the specific image, a weight $\alpha$ is assigned. According to a position that the main content area falls into a preset proportional portion of the total area of the specific image, a weight β is assigned. Accordingly, an amount of connection areas that is included in the main content area of the specific image, a weight γ is assigned. A sum of α, β, and γ is used as a weight B of the main content area. If the weight B is larger than a second preset threshold, the specific image is determined as qualified to be applicable at the website.

In an example embodiment, if the amount of pixels in the connection area that are within the preset distance to the edge of the specific image is larger than a certain portion of a total amount of pixels in the connection area, the connection area is determined as a background area of the specific image. According to a size relationship between the background area of the specific image and the total area of the specific image, a weight C is assigned. If the weight C is larger than a third preset threshold, the specific image is determined as qualified to be applicable at the website.

In another example embodiment, the weight A of the frame of the specific image, the weight B of the main content area, and the weight C of the background area multiplies a proportional coefficient respectively. The present techniques then determine whether a result of the multiplying is larger than a fourth preset threshold. If the result of the multiplying is larger than the fourth preset threshold, the specific image is determined as qualified to be applicable at the website.

The present disclosure also provides an example apparatus for detecting a specific image applicable at a website. The apparatus may include a basic information detecting unit that detects basic information of the specific image and a frame existence detecting unit that detects an existence of a frame of the specific image. The frame existence detecting unit may include a specific image obtaining sub-unit, a color filling sub-unit, a pixel amount statistics sub-unit, and a frame existence determining sub-unit.

The specific image obtaining sub-unit obtains the specific image to be applicable at the website. The specific image is an image that satisfies an application requirement of the website according to a type of the website.

The color filling sub-unit calculates an edge characteristic value of each pixel of the specific image, finds a pixel whose edge characteristic value is a local maximum value along a slope direction determined by the edge characteristic value of each pixel, and, when the edge characteristic value of the found pixel is larger than a preset characteristic value threshold, fills the pixel whose edge characteristic value is the local maximum value with a preset color.

The pixel amount statistics sub-unit scans the specific image and counts an amount of pixels whose color is the preset color at each scanning line of the specific image.

The frame existence determining sub-unit, when the amount of such pixels at a scanning line is larger than a preset number threshold, determines a line where the scanning line locates as an edge line of the frame.

For example, when the frame existence determining sub-unit determines that the amount of such pixels at the scanning line is larger than the preset number threshold and the scanning line is located within an area determined by a preset length to the edge of the specific image, the line where the scanning line locates is determined as the edge line of the frame.

For another example, when the frame of the specific image is a quadrilateral and the frame has a certain width, the frame existence determining sub-unit determines a most interior edge line among the determined multiple edge lines as an interior boundary and a most exterior edge line among the determined multiple edge lines as an exterior boundary. A distance between the interior boundary and the exterior boundary is determined as a width of the frame. The width of the frame is divided by the preset distance length. A weight A is assigned according to a result of the division. If a sum of the weights of four sides of the quadrilateral is larger than a first preset weight threshold, the specific image is determined as qualified to be applicable at the website.

The apparatus may also include a main content area detecting unit that detects a main content area of the specific image. The main content area detecting unit may include a grayscale image converting sub-unit, a connection area marking sub-unit, a connection area obtaining sub-unit, a pixel statistics sub-unit, and a main content area determining sub-unit.

The grayscale image converting sub-unit converts the specific image to a grayscale image including at least two colors. The connection area marking sub-unit marks a connection area of each color in the grayscale image. A connection area obtaining sub-unit obtains a connection area that is larger than a preset proportion of a total area of the specific image. A pixel statistics sub-unit counts an amount of pixels in each connection area that are within the preset distance to the edge of the specific image. The main content area determining unit, when the amount of pixels is not larger than a certain portion of a total amount of pixels in the connection area, determines the connection area as the main content area of the specific image.

For another example, the main content area detecting unit may also include a weight assigning sub-unit. The weight assigning sub-unit, according to a size relationship between the main content area of the specific image and the total area of the specific image, assigns a weight α. The weight assigning sub-unit, according to a position that the main content area falls into a preset proportional portion of the total area of the specific image, assigns a weight β. The weight assigning sub-unit, according an amount of connection areas that is included in the main content area of the specific image, assigns a weight γ. A sum of α, β, and γ is used as a weight B of the main content area. If the weight B is larger than a second preset threshold, the main content area determining sub-unit determines that the specific image is qualified to be applicable at the website.

For another example, the apparatus may also include a background area determining sub-unit. If the amount of pixels in the connection area that are within the preset distance to the edge of the specific image is larger than a certain portion of a total amount of pixels in the connection area, the background area determining unit determines the connection area as a background area of the specific image. According to a size relationship between the background area of the specific image and the total area of the specific image, the background area determining unit assigns a weight C. If the weight C is larger than a third preset threshold, the specific image is determined as qualified to be applicable at the website.

For another example, the apparatus may also include a proportional coefficient calculating unit that multiplies the weight A of the frame of the specific image, the weight B of the main content area, and the weight C of the background area with a proportional coefficient respectively. If the result of the multiplying is larger than the fourth preset threshold, the apparatus determines that the specific image is qualified to be applicable at the website.

The present techniques, after obtaining the specific image to be applicable at the website, detect the existence of the frame of the specific image. Compared with the conventional techniques, the present techniques not only detect the basic information of the specific image according to the conventional techniques but also detect complex information, e.g., the existence of the frame of the specific image and the main content area of specific image. The detecting process is an automatic process that applies computer programs to a massive amount of images, thereby improving a detecting efficiency of the images.

BRIEF DESCRIPTION OF THE DRAWINGS

The FIGs in the present disclosure are briefly described below to better illustrate the present techniques. Apparently, the FIGs are just some example embodiments of the present disclosure. One of ordinary skill in the art may obtain other figures based on the FIGs below without using creative efforts.

DETAILED DESCRIPTION

The following description describes the present disclosure with reference to the accompanied FIGs and example embodiments to illustrate the present techniques. The described example embodiments are just a portion of embodiment instead of all embodiments of the present disclosure. Based on the example embodiments of the present disclosure, one of ordinary skill in the art may obtain other embodiments without using creative efforts, which are also under protection scope of the present disclosure.

Figure 1:
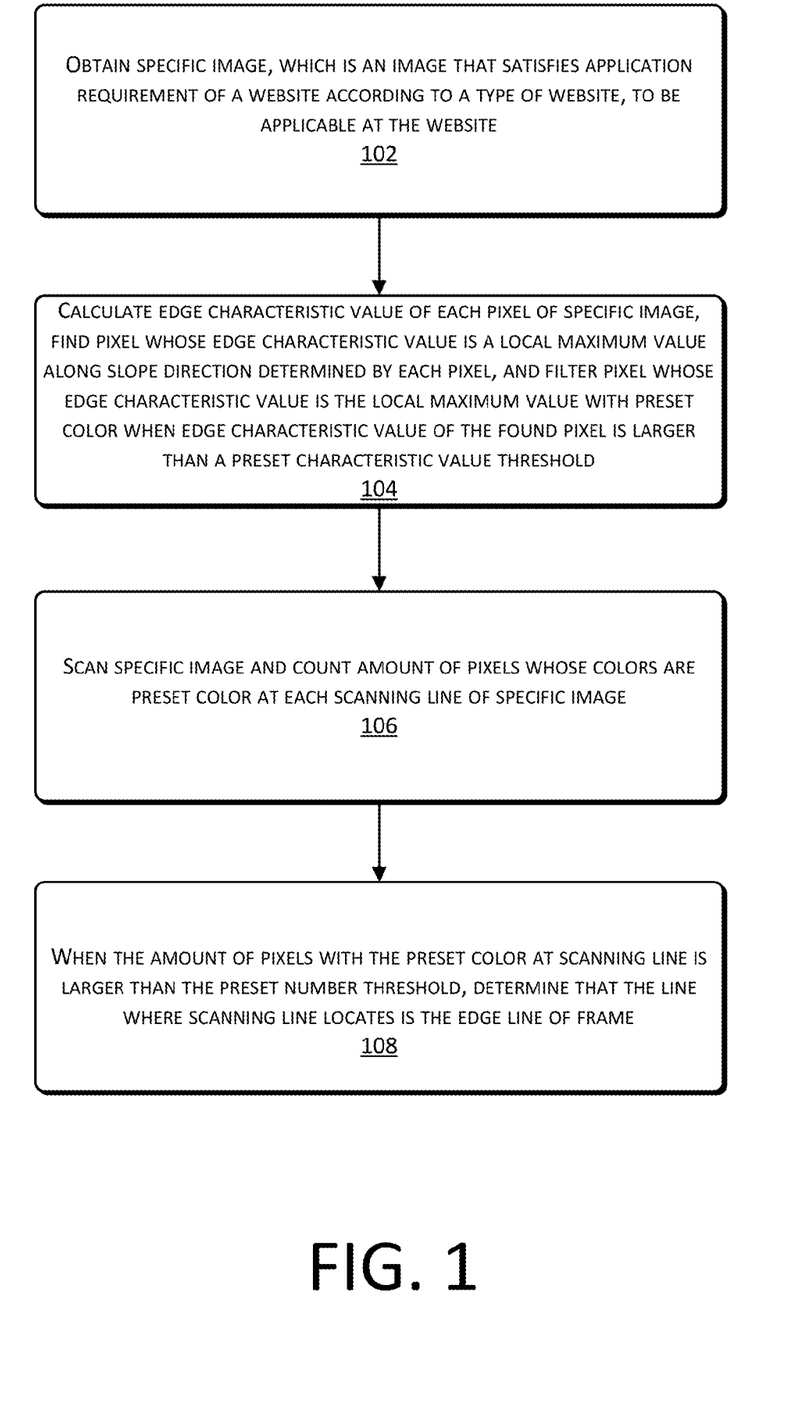
FIG. 1 is a flowchart illustrating an example method for detecting a specific image applicable at a website.

FIG. 1 is a flowchart illustrating an example method for detecting a specific image applicable at a website. The example method detects an existence of the specific image. In an example application process, a frame may include one line or multiple lines. In other words, the frame may have a certain width. The width may be measured by a distance between a most interior edge line (interior boundary) and a most exterior edge line (exterior boundary). No matter whether the frame is represented by one line or multiple lines, when detecting the existence of the frame, the frame exists as long as at least one edge line is detected.

An example process includes the following operations. At 102, a specific image to be applicable at a website is obtained. The specific image is an image that satisfies an application requirement of the website according to a type of the website.

The specific image to be applicable at the website is an electronic image for operations, e.g., displaying and processing, at the website as a media. Such an image needs to satisfy a plurality of conditions (e.g., size, color, pixel, etc. need to satisfy the conditions) and different types of websites may have different specific conditions. For example, a website for clothing that has a high demand for color may require a high clarity of the image while a website for furniture that has a high requirement for shape may require that the image has a clear shape. Thus, the present disclosure refers to such an image as the specific image. The specific image is the image that satisfies the application requirement of the website according to the type of the website. For example, with respect to the website for clothing, an image presented thereon may be an image of a cloth, hat, shoe, or sock. With respect to a website for restaurant, an image presented thereon may be an image of food.

Figure 2A:
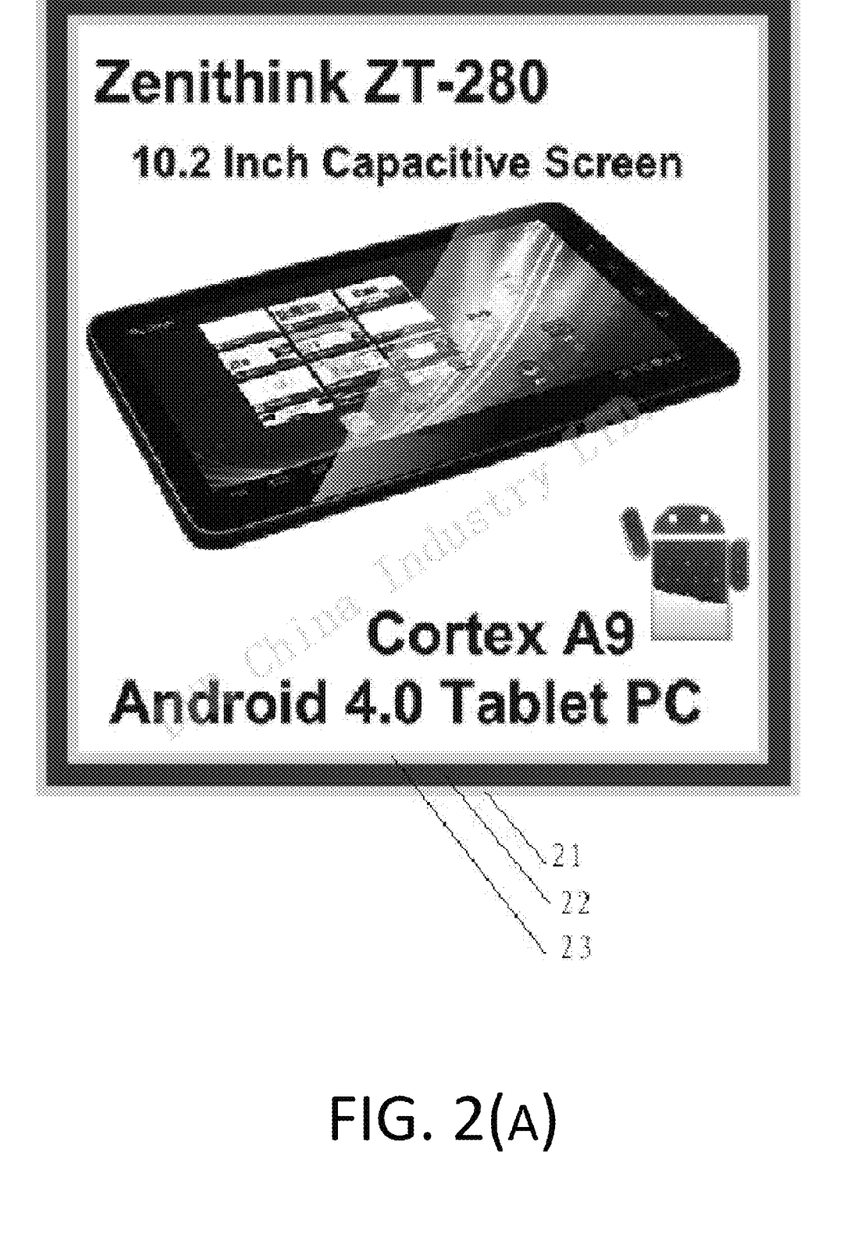
FIG. 2(a) is a diagram of an example frame of the specific image.

Some image providers may perform special processing to an image to be applicable at the website so that such image is distinguishable from another image provided by other providers. For example, a general processing method adds the frame around the image as shown in FIG. 2(a). In an example specific image as shown in FIG. 2(a), the frame includes three layers. A first layer frame 21 extends from a most exterior edge line to a first line where color changes. A second layer frame 22 extends from the first line whether color changes to a second line where color changes. A third layer frame 23 extends from the second line where color changes to a third line where color changes. The portion inside the third line is a main content portion of the specific image. Sometimes, the website may include the image with the added frame or the image without frame at the same time. To differentiate between these two types of images, a detecting for the existence of the frame of the image is implemented.

At 104, an edge characteristic value of each pixel of the image is calculated. A pixel whose edge characteristic value is a local maximum value is found along a slope direction determined by the edge characteristic value of each pixel. When the edge characteristic value of the found pixel is larger than a preset characteristic value threshold, a preset color is used to fill the pixel whose edge characteristic value is the local maximum value.

Figure 2B:
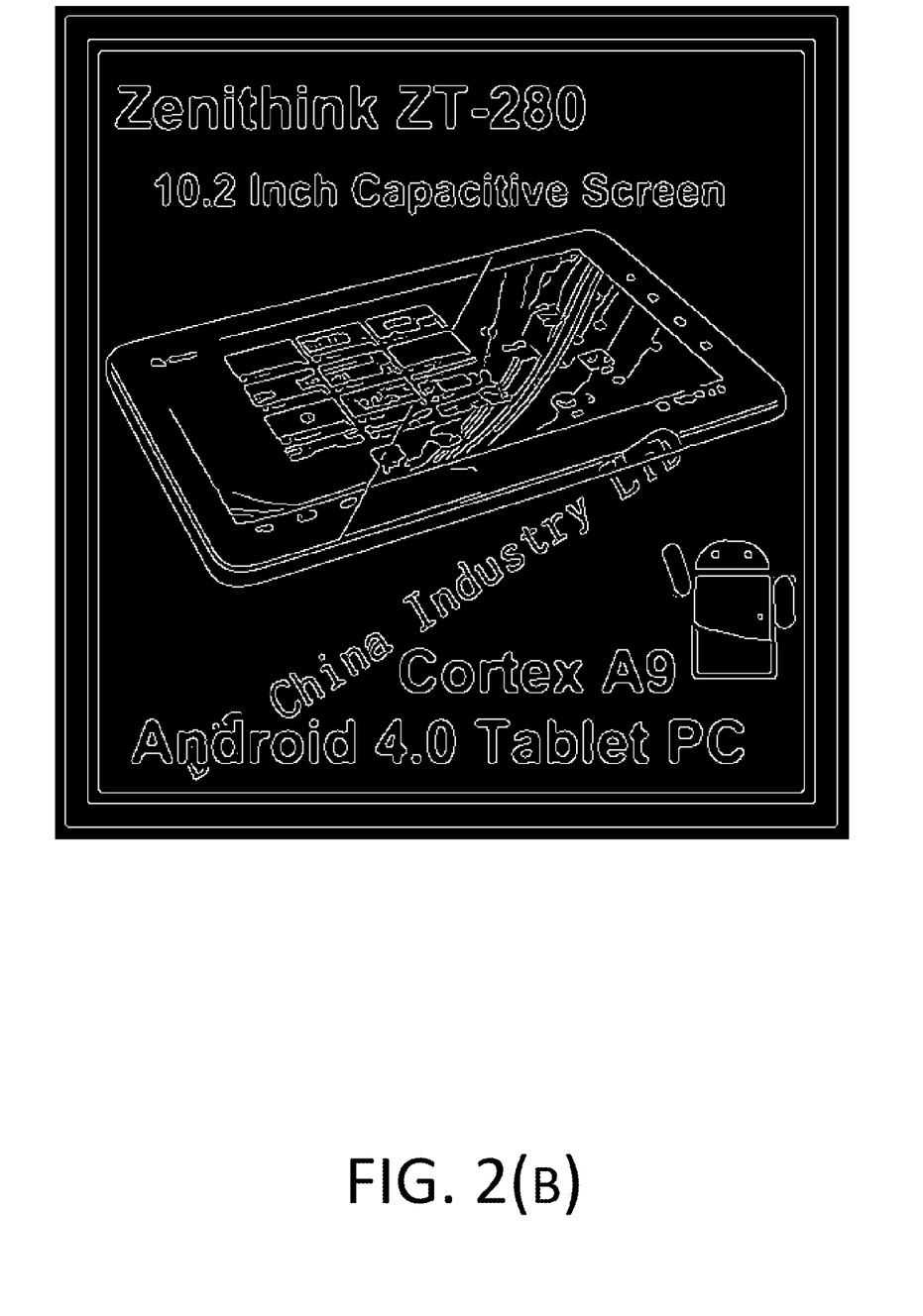
FIG. 2(b) is a diagram of an example specific image after color filling.

The edge characteristic value is a vector that describes an edge characteristic of a pixel. A modulus value of the vector represents a possibility that the pixel is a pixel on an edge. The larger the modulus value is, the larger the possibility that the pixel is on the edge. A direction of the vector represents a normal direction of the edge, i.e., a direction vertical to a tangent line of the edge. After the edge characteristic value is calculated, the local maximum value of the modulus value along the direction of the edge vector is found. A preset threshold is used to filter a final edge pixel. The edge pixel is then filled with the preset color. Example operations are as follows. After the specific image is obtained, with respect to each pixel of the specific image, the edge characteristic value of the pixel is calculated. Firstly, the components of the vector at x direction and y direction, Tx and Ty, are calculated. To calculate Tx, a rectangular filter using [−1 0 1; −1 0 1; −1 0 1] may be used to calculate the characteristic value component of the pixel. To calculate Ty, a rectangular filter using [−1 −1 −1; 0 0 0; 1 1 1] may be used to calculate the characteristic value component of the pixel. A vector module in Euclid space formula T=sqrt (Tx^2+Ty^2) is used to calculate the modulus value of the vector. α=arctan (Ty/Tx) is used to calculate a direction angle of the vector. After the moduli and directions of edge vectors of all pixels of the image are obtained, a pixel whose edge characteristic value is a local maximum value along a direction of the vector is found among all pixels. An example implementation method is to compare the edge characteristic value of a respective pixel to that of two pixels adjacent to the respective pixel along the direction of the vector. When the edge characteristic value of the respective pixel is larger than that of the two adjacent pixels, the edge characteristic value of the respective pixel is the local maximum value. Otherwise, it is not. Then the edge characteristic value of the respective pixel is compared with the preset characteristic threshold. If the former is larger than the preset characteristic threshold, the respective pixel is a point at the edge and is filled with the preset color. FIG. 2(b) illustrates an example image after processed according to the above operations.

During the process to determine the point at the edge, some additional operations may be conducted in some example embodiments to achieve better technical effects. For example, before the edge characteristic value is calculated, a grayscale processing and a Gaussian smoothing processing are applied to the specific image. The purpose of the grayscale processing is to form a grayscale image. The grayscale image is a single channel image while a color image is an at least three-channel image. After the grayscale processing, the speed of the following operations is increased. For example, the grayscale processing may apply a weighted average operation to a sample value of each channel of the image. For instance, with respect to the color image with RGB format, there are two example grayscale methods. One is a directly weighted average, i.e., Gray=(R+G+B)/3. The other assigns a proper weight to each of the R, G, and B color component in consideration of human eye characteristics. For instance, Gray=0.299R+0.587G+0.114B. A color image with another format may be converted to the RGB format according to a corresponding conversion relationship and then the grayscale processing is applied. The purpose of the Gaussian smoothing processing is to reduce noise in the image that may interfere with the following operations. For example, two one-dimensional Gaussian kernels may be used to implement two weighted operations respectively. Alternatively, one two-dimensional kernel may be used to implement one convolution operation.

For example, when the pixel with the local maximum value is determined along the direction of the edge characteristic vector of the pixel, it is probable that the direction of the vector does not pass an existing pixel of the specific image. Then an intersection point of a connection line between the most adjacent two points and the vector is considered. A module of the edge characteristic vector of the pixel at the interaction point is obtained through a linear interpolation, a fitting, or etc.

For another example, after the pixel with the local maximum value of the edge characteristic value is found and when the local maximum value is compared with the characteristic threshold, two level comparing modes may be used. That is, two characteristic thresholds are set, in which one characteristic threshold is larger than the other. The local maximum value that is larger than the larger characteristic threshold is determined as a preliminary edge point. Starting from determined preliminary edge points, an edge point that is connected with the points and larger than the smaller characteristic threshold is determined as a final edge point. With respect to the two thresholds, for example, 30% and 70% thresholds in the statistics distribution may be used. In other words, 30% samples are larger than the larger threshold while 70% samples are larger than the smaller threshold.

At 106, the specific image is scanned. An amount of pixels whose colors are the preset color at each scanning line of the specific image is counted.

After the specific image is marked by color according to the above operations, the specific image is scanned. The amount of pixels whose colors are the preset color at each scanning line is counted. For example, assuming that the preset color is white, a pixel with the preset color is marked as "1" in computer. If the detected frame is square, an amount of "1" can be scanned and conducted statistics according to column or row.

During the counting or statistics operation, a direction of statistics depends on a shape of the frame to be detected. For example, when the frame is a square, there may be two modes. One mode is from the exterior to the interior. That is, along a direction from the edge of the specific image to the central axis of the specific image, the counting operation is applied to scanning lines column by column or row by row. The other mode is from the interior to the exterior. That is, along a direction from the central axis of the specific image to the edge, the counting operation is applied to the scanning lines column by column or row by row. As some columns or rows may be missing when a center of the specific image is determined according to the mode from the interior to the exterior, the present techniques, for example, may conduct statistics or counting according to the scanning mode from the exterior to the interior. For another example, when the frame is a circle, the scanning direction may be from the exterior to the centre of the circle (centre) or from the centre to the exterior. For another example, when the frame is an isosceles triangle, the scanning direction may be from the exterior to a centroid or from the centroid to the exterior.

The object to which the counting operation is applied is the scanning line. The scanning line may be different according to the shape of the frame to be detected. For example, when the frame is the square, the scanning line is a line, column, or straight line. When the frame is the circle, the scanning line is a circle-shape scanning line by using a centre of the specific image as the centre of the circle.

With respect to an area to which the counting operation is applied, there may also be two modes. One mode is a whole area type. The whole area of the specific image is scanned and the counting operation is applied to the whole area, which is suitable for some images that have relatively small main content areas while the whole images are large. The other mode is a peripheral regional area type. That is, some areas of the specific image are selected for scanning. The mode of peripheral regional area type may be selected because the frame added to the specific image usually has regular characteristic (e.g., rectangle, circle, etc.) and is located at the peripheral portion of the specific image and it is a waste of resources to scan and conduct statistics of the whole area of the image. Thus, in an example practical implementation, the present techniques may generally be set to scan and conduct statistics or the counting operation from the edge of the image to a center portion of the image. For example, with respect to a rectangle frame, at a horizontal direction, an area from the edge of the image to a 15% point of the width of the image may be set as the area for scanning and statistics according to line. A portion outside the area (i.e., at the horizontal direction, if a left edge is at 0% point and a right edge is at 100% point, an area between 15% point and 85% point is the portion outside the preset scanning area) does not need scanning and statistics. With respect to a circle frame, an area outside a circle that uses a center of the image as a center point and R as a radius is set as the area for scanning and statistics.

It is noted that the above 15% and R as the radius may be selected according to actual situations based on a plurality of factors, e.g., a computing capability of a processing unit, a statistics learning result from frame positions of a lot of images, a requirement of the website to the frame, etc. In addition, the one or more methods of the above directions and areas for statistics may be combined to satisfy actual application needs.

At 108, when the amount of pixels with the preset color at a scanning line is larger than a preset number threshold, a line where the scanning line locates is determined as an edge line of the frame.

After the above statistics or counting, the present techniques determine whether the scanning line is the frame according to the statistics or counting result. For example, when the amount of pixels with the preset color at the scanning line is larger than the preset number threshold, the curve or line that the scanning line locates belongs to the edge line of the frame. Otherwise, such scanning line is not the edge line. Thus, the detecting of the existence of the frame of the specific image is accomplished. In an example application implementation, in addition to using a size relationship between the counted amount of pixels with the preset color and the preset number threshold as a determining condition, the present techniques may also add some other conditions to improve a determining accuracy and efficiency.

For example, when a square frame needs detecting, an example method is to use a position of the scanning line/row as a strengthening condition. That is, in addition to determining whether an amount of pixels with the preset color at a particular line or row is larger than the preset number threshold, the present techniques may also determine whether the position of the particular line or row is within a preset region. For instance, the preset region may be set from the edge of the specific image to a boundary at a certain percentage of a central axis from the edge to the center of the image. If the amount of pixels with the preset color at the particular line or row is larger than the preset number threshold and the particular line or row locates within the preset region, the particular line or row is determined as the frame.

It is noted that a first preset threshold may have a corresponding relationship with a shape of the frame. For example, if an image with a square frame needs to be detected from a massive amount of images, the preset threshold with respect to scanning each line/row from a horizontal direction may be set the same as that from a vertical direction. Alternatively, the preset threshold may be different with respect to scanning each line/row from a horizontal direction and from a vertical direction. For another example, when an image with a frame of another shape needs to be detected, such as the isosceles triangle, different thresholds may be set for two equal sides and a third side of the isosceles triangle respectively to determine the existence of the frame from different directions.

The present techniques, after obtaining the specific image to be applicable at the website, detect the existence of the frame of the specific image. Compared with the conventional techniques, the present techniques not only detect the basic information of the specific image according to the conventional techniques but also detect complex information, e.g., the existence of the frame of the specific image. The detecting process is an automatic process that applies computer programs to a massive amount of images, thereby improving a detecting efficiency.

The above example embodiment is a general example embodiment that achieves corresponding technical effects when applying the present techniques. In an actual implementation, the general example embodiment may have various modifications or changes based upon needs to satisfy certain special requirements. For example, in most circumstance, the frame has a certain width. When the width of the frame is taken into consideration, the width of the frame needs to be determined at first. For example, a most interior edge line among the multiple edge lines is determined as an interior boundary of the frame. A most exterior edge line among the multiple edge lines is determined as an exterior boundary of the frame. A distance between the interior boundary and the exterior boundary is determined as the width of the frame.

After the frame is determined, different sides of the frame or different widths of the frame may be assigned different weights. For example, if the website emphasizes an upper side of the rectangular frame, the upper side of the frame is assigned a larger weight. Otherwise, the upper side of the frame is assigned a smaller weight. In some examples when both the weights of the sides of the frame and the weights of the widths of the frame are taken into consideration, the widths may be further processed. For instance, the widths of the frame may be divided by a height or a width of the specific image or a certain percentage of the height or width of the specific image. A result of the division is assigned a weight. The width weights of the four sides of the frame are added to obtain an overall weight. The overall weight is compared with a preset weight value to select the specific image whose frame is qualified.

The above example embodiments describe the process of detecting the existence of the frame according to the present disclosure. Such detecting represents the detecting requirement of the specific image applicable at the website. In the actual implementation process, the detecting process of the specific image applicable at the website may include basic information detecting and complex detecting. The complex detecting includes not only the detecting of the existence of the frame but also a detecting of a main content area of the specific image.

Figure 3:
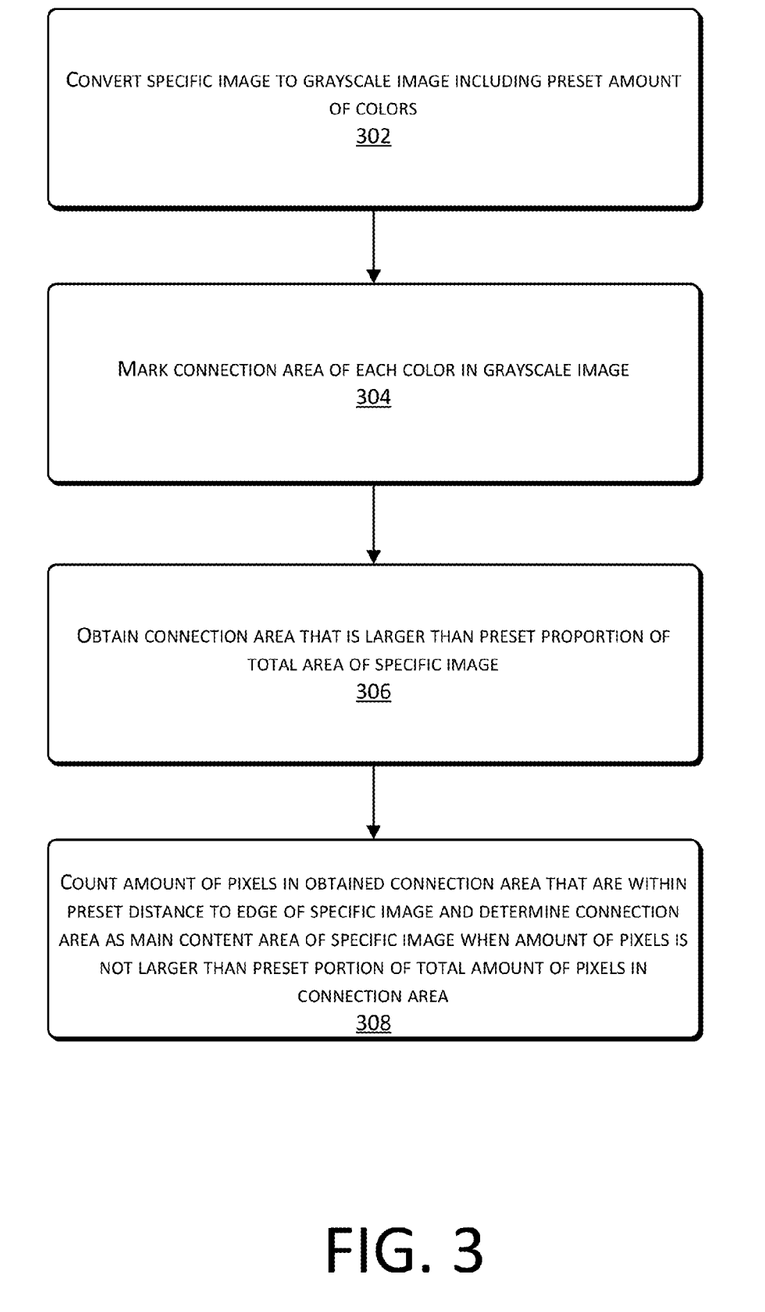
FIG. 3 is a flowchart illustrating another example method for detecting the specific image applicable at the website.

FIG. 3 is a flowchart illustrating an example method for detecting a main content area of the specific image applicable at the website. The main content area of the specific image is a portion of the specific image that represents main information. For example, with respect to a cloth-type image, information of the image that its provider would like to transmit is a cloth in the image. Then, the cloth is the main content of the specific image. The area where the cloth locates in the specific image is the main content area of the specific image (or main area). The processing of detecting the main area of the specific image may include the following operations.

At 302, the specific image is converted to a grayscale image including a preset amount of colors.

The grayscale image is relative to a color image. The color image usually has three or more colors. The grayscale image has a limited number of colors, such as a common two value grayscale image, in which there are only two colors, i.e., black and white.

At 304, a connection area of each color is marked in the grayscale image.

To mark the continuous area of each preset color, the pixels in the grayscale image may be numeralized. For example, the pixels may be represented by "0" or "1." In a 0-255 grayscale system, assuming that a preset threshold for a white pixel is 240, a pixel whose grayscale is larger than 240 is determined as a white pixel and marked by "1." A pixel whose grayscale is lower than 240 is determined as a black pixel and marked by "0." From a random point in the marked 0-1 image, pixels whose adjacent pixels are all "0" or "1" are determined as the connection area until all pixels in the grayscale image belong to a certain connection area.

At 306, a connection area that is larger than a preset proportion of a total area of the specific image is obtained.

Multiple connection areas are determined according to the above operations. Not all of the determined connection areas are the main content area. For instance, only a connection area that represents a certain percentage (e.g., 5%) of the total area of the specific image may be the main content area. Thus, each connection area is compared with a preset portion of the total area of the specific image. When a particular connection area is larger than the preset portion of the total area of the specific image, the particular connection area is extracted as a candidate of the main content area for the following operations. When the particular connection area is smaller than the preset portion of the total area of the specific image, such connection area is discarded and not considered as the candidate.

For example, in an actual implementation process, to improve the accuracy and efficiency of detecting the main content area, the conditions for filtering the connection area may be more limited. For example, in addition to requiring that the candidate connection area is larger than the preset portion of the specific image, the present techniques may also require that the candidate connection area ranks in certain top positions among all connection area. The connection area needs to satisfy these two conditions to be treated as the candidate connection area. In an actual implementation, all connection areas may be ranked from large to small (or from small to large). The connection areas whose area sizes are in top 10 list of all connection areas are selected. These 10 connection areas are further determined whether each of them are larger than 5% of the total area of the specific image. Connection areas that satisfy the two conditions are obtained. The other connection areas are not considered as the main content area.

At 308, an amount of pixels in the obtained connection area that are within a preset distance to the edge of the specific image is counted. If the amount of pixels is not larger than a preset portion of a total amount of pixels in the connection area, the connection area is determined as the main content area of the specific image.

After the main content area of the specific image is selected through the above operations, a possible position of the connection area is further determined. Generally, the main content area should be located at a center location of the specific image. If a particular connection area is located near the edge of the specific image, such connection area is not likely to be the main content area and is probably a background area. Thus, the amount of pixels within the preset distance to the edge of the specific image is counted (e.g., within 15% of width to the edge of the specific image), and the amount of pixels outside the preset distance to the edge of the specific image is counted. If the amount of pixels within (or outside) the preset distance to the edge of the specific image does not represent (or represents) a certain percentage (e.g., 30%) of the total amount of pixels in the connection area, the connection area primarily locates at a central position of the specific image and is determined as the main content area. Otherwise, the connection area is not the main content area and is probably the background area.

After the main content area is determined through the above operations, the main information portion is separate from the background portion in the specific image. Main content information (e.g., product) expressed by the specific image, e.g., an area size (a sum of multiple main content areas), a position (a position of the main content area), an amount (an amount of connection areas that are determined as the main content area), is further obtained. After the information is obtained, each information may be assigned a weight. This information may be weighed to determine whether the specific image is qualified. For example, according to a size relationship between the main content area of the specific image and the total area of the specific image, a weight $\alpha$ is assigned. According to a position that the main content area falls into a preset proportional portion of the total area of the specific image, a weight $\beta$ is assigned. (For example, when only the width direction is considered, if all of the main content area falls within middle 60% of the specific image along the width direction, a weight is assigned; while if a portion of the main content area falls within middle 60% of the specific image, another weight is assigned.) According to an amount of connection areas contained by the main content area of the specific image, a weight $\gamma$ is assigned. A sum of $\alpha$, $\beta$, and $\gamma$ is used as a weight B of the main content area. If the weight B is larger than a preset threshold, the specific image is determined as qualified to be applicable at the website.

For another example, according to a size relationship between the background area of the specific image and the total area of the specific image, a weight C is assigned. If the weight C is larger than a preset threshold, the specific image is determined as qualified to be applicable at the website.

In another example actual application process, the weight A of the frame of the specific image, the weight B of the main content area, and the weight C of the background area may be comprehensively considered to determine whether the specific image is qualified. When the three weights are comprehensively weighted, different proportional coefficients are assigned. The three weights are multiplied by different proportional coefficients to determine whether a result of the multiplying is larger than a preset threshold. If the result of the multiplying is larger than the preset threshold, the specific image is determined as qualified to be applicable at the website.

Figure 4:
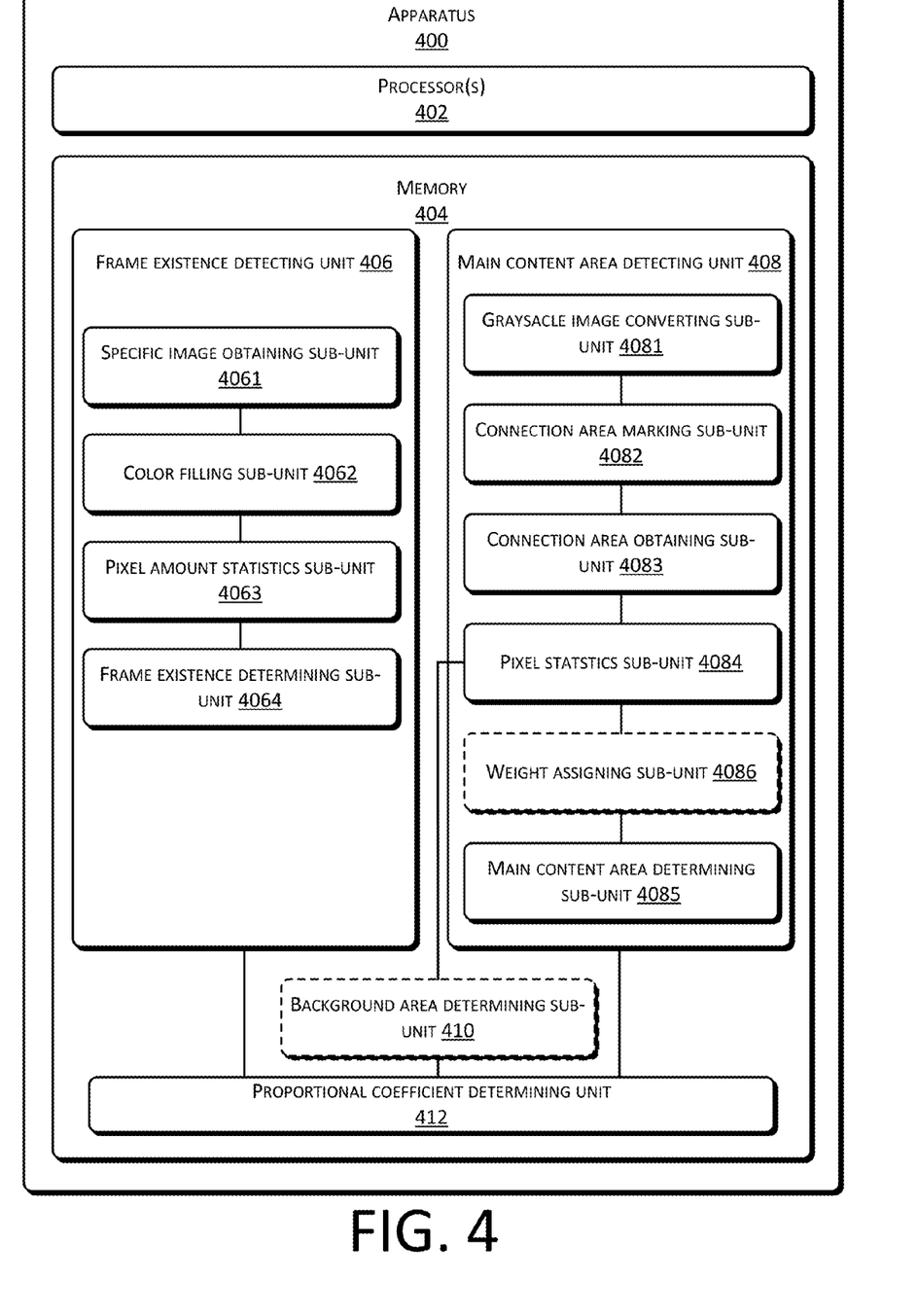
FIG. 4 is a diagram illustrating an example apparatus for detecting a specific image applicable at a website.

The above example embodiment describes the example methods for detecting the specific image applicable at the website. Correspondingly, the present disclosure also provides an example apparatus 400 for detecting a specific image applicable at a website. The apparatus 400, as shown in FIG. 4, may include one or more processor(s) 402 or data processing unit(s) and memory 404. The memory 404 is an example of computer-readable media. As used herein, "computer-readable media" includes computer storage media and communication media. Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 404 may store therein a plurality of modules including a frame existence detecting unit 406 that detects an existence of a frame of the specific image. FIG. 4 illustrates a diagram of components of the frame existence detecting unit 406. In the example of FIG. 4, the frame existence detecting unit 406 may include a specific image obtaining sub-unit 4061, a color filling sub-unit 4062, a pixel amount statistics sub-unit 4063, and a frame existence determining sub-unit 4064.

The specific image obtaining sub-unit 4061 obtains the specific image to be applicable at the website. The specific image is an image that satisfies an application requirement of the website according to a type of the website.

The color filling sub-unit 4062 calculates an edge characteristic value of each pixel of the specific image. The edge characteristic value is a coordinate difference at a horizontal and a vertical coordinate between a pixel and its adjacent pixel. The color filling sub-unit 4062 finds a pixel whose edge characteristic value is a local maximum value along a slope direction determined by the horizontal coordinate difference and a vertical coordinate difference of each pixel, and, when the edge characteristic value of the found pixel is larger than a preset characteristic value threshold, fills the pixel whose edge characteristic value is the local maximum value with a preset color.

The pixel amount statistics sub-unit 4063 scans the specific image and counts an amount of pixels whose color is the preset color at each scanning line of the specific image.

The frame existence determining sub-unit 4064, when the amount of pixels whose color is the preset color at a scanning line is larger than a preset number threshold, determines a line where the scanning line locates as an edge line of the frame.

An example process for determining the existence of the frame is as follows. The specific image obtaining sub-unit 4061 obtains the specific image to be applicable at the website. The color filling sub-unit 4062 calculates an edge characteristic value of each pixel of the specific image, finds a pixel whose edge characteristic value is a local maximum value along a slope direction determined by the horizontal coordinate difference and a vertical coordinate difference of each pixel, and, when the edge characteristic value of the found pixel is larger than a preset characteristic value threshold, fills the pixel whose edge characteristic value is the local maximum value with a preset color. The pixel amount statistics sub-unit 4063 scans the specific image and counts an amount of pixels whose color is the preset color at each scanning line of the specific image. The frame existence determining sub-unit 4064, when the amount of pixels whose color is the preset color at a scanning line is larger than a preset number threshold, determines a line where the scanning line locates as an edge line of the frame.

The present techniques, after obtaining the specific image to be applicable at the website, detect the existence of the frame of the specific image. Compared with the conventional techniques, the present techniques not only detect the basic information of the specific image according to the conventional techniques but also detect complex information, e.g., the existence of the frame of the specific image. The detecting process is automatic process that performs computer programs and may be automatically applied to a lot of images, thereby improving a detecting efficiency of the images.

The above example apparatus may be improved upon needs to achieve better technical effects. For example, when detecting the frame, the present techniques may consider not only the amount of pixels whose color is the preset color at the scanning line but also a position of the scanning line. In general, a line that is in the middle position of the specific image, although its amount of pixels whose color is the preset color satisfies the preset number threshold, may not be the frame. Thus, after determining that the amount of pixels whose color is the preset color is larger than the preset number threshold, if the scanning line is within a preset distance to the edge of the specific image, the line where the scanning locates is determined as the edge line of the frame. The present techniques may use the two conditions to determine the frame, thereby more accurately determining the frame.

For another example, in some circumstances, although the frame is detected, there may be multiple edge lines of the frame at a direction of the specific image. The frame, in fact, is a frame with certain width. Further, the width of the frame may be used to determine whether the specific image is qualified. For instance, when the frame of the specific image is a quadrilateral and the frame has a certain width, the frame existence determining sub-unit 4064 determines a most interior edge line among the determined multiple edge lines as an interior boundary and a most exterior edge line among the determined multiple edge lines as an exterior boundary. A distance between the interior boundary and the exterior boundary is determined as a width of the frame. The width of the frame is divided by the preset distance length. A weight A is assigned according to a result of the division. If a sum of the weights of four sides of the quadrilateral is larger than a preset weight threshold, the specific image is determined as qualified to be applicable at the website.

For another example, the apparatus 400, in addition to detecting the existence of the frame, may also detect the main content area of the specific image. The existence of the frame and the main content area both belong the category for detecting complex information of the specific image. When detecting the main content area, the apparatus may further include a main content area detecting unit 408. For example, the plurality of modules stored on the memory 404 further includes the main content area detecting unit 408. The main content area detecting unit 408 may include a grayscale image converting sub-unit 4081, a connection area marking sub-unit 4082, a connection area obtaining sub-unit 4083, a pixel statistics sub-unit 4084, and a main content area determining sub-unit 4085.

The grayscale image converting sub-unit 4081 converts the specific image to a grayscale image including at least two colors. The connection area marking sub-unit 4082 marks a connection area of each color in the grayscale image. A connection area obtaining sub-unit 4083 obtains a connection area that is larger than a preset proportion of a total area of the specific image. A pixel statistics sub-unit 4084 counts an amount of pixels in each connection area that are within the preset distance to the edge of the specific image. The main content area determining unit 4085, when the amount of pixels is not larger than a certain portion of a total amount of pixels in the connection area, determines the connection area as the main content area of the specific image.

An example process of the main content area detecting unit 408 for determining the main content area is as follows. The grayscale image converting sub-unit 4081 converts the specific image to a grayscale image with a preset amount of colors. The connection area marking sub-unit 4082 marks a connection area of each color in the grayscale image. A connection area obtaining sub-unit 4083 obtains a connection area that is larger than a preset proportion of a total area of the specific image. A pixel statistics sub-unit 4084 counts an amount of pixels in each connection area that are within the preset distance to the edge of the specific image. The main content area determining unit 4085, when the amount of pixels is not larger than a certain portion of a total amount of pixels in the connection area, determines the connection area as the main content area of the specific image.

The above example apparatus for detecting the main content area may be improved upon needs to achieve better technical effects. For another example, the main content area detecting unit 408 may further include a weight assigning sub-unit 4086. The weight assigning sub-unit 4086, according to a size relationship between an area of the main content area of the specific image and the total area of the specific image, assigns a weight $\alpha$. The weight assigning sub-unit 4086, according to a position that the main content area falls into a preset proportional portion of the total area of the specific image, assigns a weight $\beta$. The weight assigning sub-unit 4086, according an amount of connection areas contained by the main content area of the specific image, assigns a weight $\gamma$. A sum of $\alpha$, $\beta$, and $\gamma$ is used as a weight B of the main content area. If the weight B is larger than a second preset threshold, the main content area determining unit determines that the specific image is qualified to be applicable at the website. Through the addition of the weight assigning sub-unit 4086, attributes related to the main content area are comprehensively considered. The comprehensively considered result is used to determine whether the specific image is qualified.

For another example, after the main content area is determined according to an amount of pixels that satisfy the requirements in the connection area, the amount of pixels may be used to determine a background area. The apparatus 400 may further include a background area determining sub-unit 410. For instance, the plurality of modules stored on the memory 404 further includes the background area determining sub-unit 410. The background area determining sub-unit 410 determines the connection area as the background area of the specific image when the amount of pixels in the connection area that are within the preset distance to the edge of the specific image is larger than a certain portion of a total amount of pixels in the connection area, and, according to a size relationship between the background area of the specific image and the total area of the specific image, assigns a weight C. If the weight C is larger than a third preset threshold, the specific image is determined as qualified to be applicable at the website.

For another example, the weight A of the frame of the specific image, the weight B of the main content area, and the weight C of the background area may be comprehensively considered in an actual application scenario. The apparatus 400 may further include a proportional coefficient calculating unit 412. For instance, the plurality of modules stored on the memory 404 further includes the proportional coefficient calculating unit 412. The proportional coefficient calculating unit 412 multiplies the weight A of the frame of the specific image, the weight B of the main content area, and the weight C of the background area with a proportional coefficient respectively. The weighted result is used to determine whether the specific image is qualified to be applicable at the website.

It should be noted that, for the purpose of brevity, the example embodiments and their various alterations emphasize the differences from other embodiments and their alterations. The same or similar portions between different embodiments are referenced to each other. Especially, with respect to the example apparatus embodiments and their alterations, as they are similar to the example method embodiments, they are briefly described. The relevant portions may be referenced to the example method embodiments. The units of the example apparatus embodiments may or may not be physically separate, locate at a same location, or distribute among multiple network environments. In an actual implementation, some or all units may be selected to implement the purpose of the present disclosure according to actual needs. One of ordinary skill in the art may understand and implement without using creative efforts.

The above description only describes some example embodiments of the present disclosure. It should be noted that one of ordinary skill in the art may make many variations and modifications without departing from the scope and the spirit of the present disclosure. Such variations and modifications shall be deemed under the protection of the present disclosure.

What is claimed is:

1. A method comprising:
   obtaining a specific image;
   calculating an edge characteristic value of multiple pixels of the specific image;
   finding a pixel whose edge characteristic value is a local maximum value along a slope direction of the pixel;
   when the edge characteristic value of the found pixel is larger than a preset characteristic value threshold, filling the pixel whose edge characteristic value is the local maximum value with a preset color;
   scanning the specific image;
   counting an amount of pixels whose color is the preset color at a scanning line of the specific image; and
   when the amount of pixels whose color is the preset color is larger than a preset number threshold, determining a line where the scanning line locates as an edge line of a frame of the specific image.

2. The method of claim 1, wherein the specific image is an image that satisfies an application requirement of a website according to a type of the website.

3. The method of claim 1, wherein the determining the line where the scanning line locates as the edge line of the frame of the specific image comprises:
   determining that the scanning line is within a preset distance to an edge of the specific image; and
   determining that the line where the scanning line locates is the edge line of the frame of the specific image.

4. The method of claim 1, further comprising:
   determining a most interior edge line among multiple edge lines as an interior boundary of the frame;
   determining a most exterior edge line among the multiple edge lines as an exterior boundary of the frame;
   determining a distance between the interior boundary and the exterior boundary as a width of the frame;
   dividing the width of the frame by a preset distance length;
   assigning a weight of a side of the frame according to a result of the dividing; and
   when a weight of the frame is larger than a first preset weight threshold, determining that the specific image is qualified.

5. The method of claim 4, wherein the weight of the frame is a sum of weights of four sides of the frame.

6. The method of claim 4, further comprising detecting a main content area of the specific image.

7. The method of claim 6, wherein the detecting the main content area of the specific image comprises:
   converting the specific image to a grayscale image including at least two colors;
   marking a connection area of each color in the grayscale image;
   obtaining a connection area that is larger than a preset proportion of a total area of the specific image;
   counting an amount of pixels in each connection area that are within a preset distance to an edge of the specific image; and
   when the amount of pixels is not larger than a preset portion of a total amount of pixels in the connection area, determining the connection area as the main content area of the specific image.

8. The method of claim 7, further comprising:
   according to a size relationship between the main content area of the specific image and the total area of the specific image, assigning a first weight;
   according to a position that the main content area falls into a preset proportional portion of the total area of the specific image, assigning a second weight;
   according to an amount of connection areas contained by the main content area of the specific image, assigning a third weight;
   using a sum of the first weight, the second weight, and the third weight as a weight of the main content area; and
   when the weight of the main content area is larger than a second preset weight threshold, determining that the specific image is qualified.

9. The method of claim 8, further comprising:
   when the amount of pixels in another connection area that are within the preset distance to the edge of the specific image is larger than the preset portion of the total amount of pixels in the connection area, determining the another connection area as a background area of the specific image;

according to a size relationship between the background area of the specific image and the total area of the specific image, assigning a weight of the background area; and when the weight of the background area is larger than a third preset weight threshold, determining that the specific image is qualified.

10. The method of claim 9, further comprising:

multiplying the weight of the frame, the weight of the main content area, and the weight of the background area to a proportional coefficient respectively; and when a result of the multiplying is larger than a fourth preset weight threshold, determining that the specific image is qualified.

11. An apparatus comprising:

a frame existence detecting unit including:

a specific image obtaining sub-unit that obtains a specific image;

a color filling sub-unit that calculates an edge characteristic value of multiple pixels of the specific image, finds a pixel whose edge characteristic value is a local maximum value along a slope direction of the pixel, and when the edge characteristic value of the found pixel is larger than a preset characteristic value threshold, fills the pixel whose edge characteristic value is the local maximum value with a preset color;

a pixel amount statistics sub-unit that scans the specific image and counts an amount of pixels whose color is the preset color at a scanning line of the specific image; and a frame existence determining sub-unit that, when the amount of pixels whose color is the preset color is larger than a preset number threshold, determines a line where the scanning line locates as an edge line of a frame of the specific image.

12. The apparatus of claim 11, wherein the specific image is an image that satisfies an application requirement of a website according to a type of the website.

13. The apparatus of claim 11, wherein the frame existence determining sub-unit further determines that the scanning line is within a preset distance to an edge of the specific image.

14. The apparatus of claim 13, wherein the frame existence determining sub-unit further:

determines a most interior edge line among multiple edge lines as an interior boundary of the frame;

determines a most exterior edge line among the multiple edge lines as an exterior boundary of the frame;

determines a distance between the interior boundary and the exterior boundary as a width of the frame;

divides the width of the frame by a preset distance length;

assigns a weight of a side of the frame according to a result of the dividing; and when a weight of the frame is larger than a first preset weight threshold, determines that the specific image is qualified.

15. The apparatus of claim 14, wherein the weight of the frame is a sum of weights of four sides of the frame.

16. The apparatus of claim 14, further comprising a main content area determining unit, the main content area determining unit including:

a grayscale image converting sub-unit that converts the specific image to a grayscale image including at least two colors;

a connection area marking sub-unit that marks a connection area of each color in the grayscale image;

a connection area obtaining sub-unit that obtains a connection area that is larger than a preset proportion of a total area of the specific image;

a pixel statistics sub-unit that counts an amount of pixels in each connection area that are within a preset distance to an edge of the specific image; and a main content area determining sub-unit that, when the amount of pixels is not larger than a preset portion of a total amount of pixels in the connection area, determines the connection area as the main content area of the specific image.

17. The apparatus of claim 16, wherein:

the main content area determining unit further includes a weight assigning sub-unit that:

according to a size relationship between the main content area of the specific image and the total area of the specific image, assigns a first weight;

according to a position that the main content area falls into a preset proportional portion of the total area of the specific image, assigns a second weight;

according to an amount of connection areas contained by the main content area of the specific image, assigns a third weight; and uses a sum of the first weight, the second weight, and the third weight as a weight of the main content area; and the main content area determining sub-unit, when the weight of the main content area is larger than a second preset weight threshold, determines that the specific image is qualified.

18. The apparatus of claim 17, further comprising a background area determining unit that:

when the amount of pixels in another connection area that are within the preset distance to the edge of the specific image is larger than the preset portion of the total amount of pixels in the connection area, determines the another connection area as a background area of the specific image;

according to a size relationship between the background area of the specific image and the total area of the specific image, assigns a weight of the background area; and when the weight of the background area is larger than a third preset weight threshold, determines that the specific image is qualified.

19. The apparatus of claim 18, further comprising a proportional coefficient calculating unit that:

multiplies the weight of the frame, the weight of the main content area, and the weight of the background area to a proportional coefficient respectively; and when a result of the multiplying is larger than a fourth preset weight threshold, determines that the specific image is qualified.

20. One or more computer storage media stored thereon computer-executable instructions executable by one or more processors to perform operations comprising:

obtaining a specific image;

calculating an edge characteristic value of multiple pixels of the specific image;

finding a pixel whose edge characteristic value is a local maximum value along a slope direction of the pixel;

when the edge characteristic value of the found pixel is larger than a preset characteristic value threshold, filling the pixel whose edge characteristic value is the local maximum value with a preset color;

scanning the specific image;

counting an amount of pixels whose color is the preset color at a scanning line of the specific image; and when the amount of pixels whose color is the preset color is larger than a preset number threshold, determining a line where the scanning line locates as an edge line of a frame of the specific image.

* * * * *